10

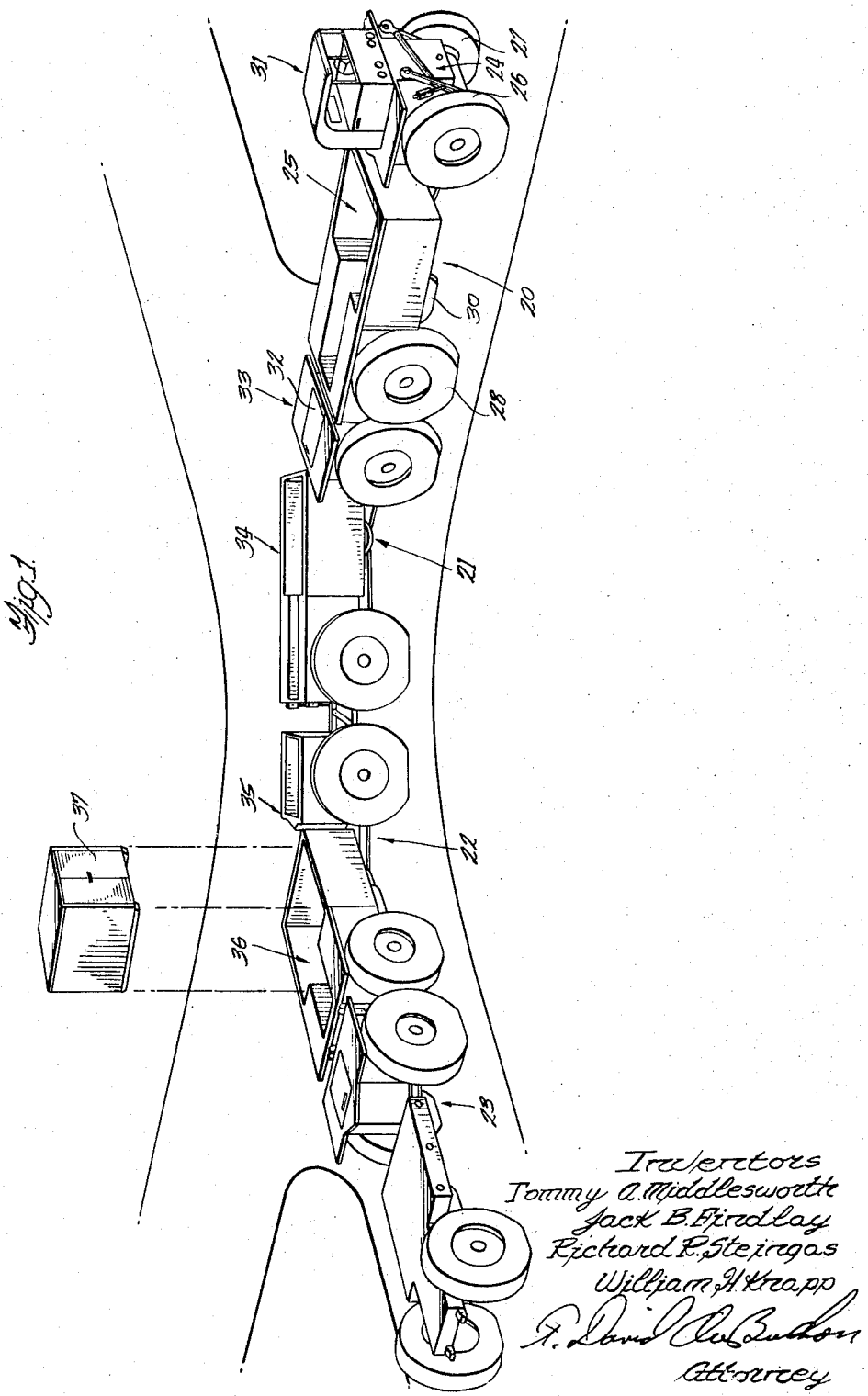

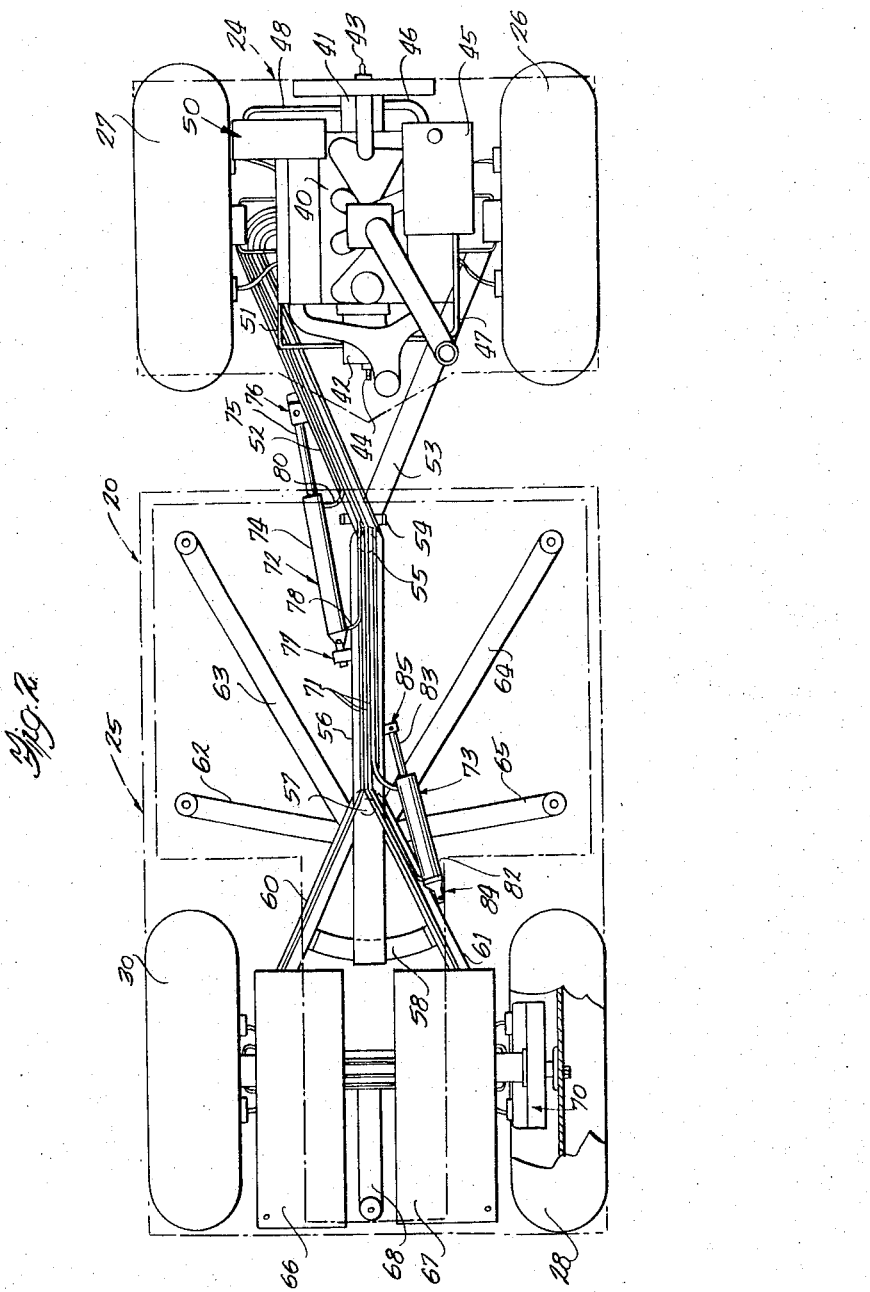

United States Patent Office 3,294,192
Patented Dec. 27, 1966

3,294,192
ARTICULATED MODULAR VEHICLE
Tommy A. Middlesworth, Hinsdale, Jack B. Findlay, Downers Grove, and Richard R. Steingas and William H. Knapp, Naperville, Ill., assignors to International Harvester Company, Chicago, Ill., a corporation of Delaware
Original application Mar. 8, 1962, Ser. No. 178,294, now Patent No. 3,246,714, dated Apr. 19, 1966. Divided and this application Sept. 14, 1965, Ser. No. 510,109
3 Claims. (Cl. 180—79.2)

This application is a division of applicants' copending application, Serial No. 178,294, filed March 8, 1962, that has now matured into Patent No. 3,246,714 of April 19, 1966.

This invention is directed to the field of articulated modular vehicles which can be intercoupled to form a train of vehicles, and more particularly to vehicles suitable for withstanding a multiplicity of conditions in traversing difficult terrains such as encountered in military operations.

In the general class of vehicles suitable for assault and subsequent logistic support operations, the requirements imposed by the military are stringent indeed. It is requisite that such vehicles must be able to traverse any terrain such as mud, ash, sand, etc. and even withstand shocks such as imposed by a drop with a parachute.

It is therefore a primary object of the present invention to provide an articulated vehicle which is operable independently to satisfy all of the criteria defined above.

A corollary object of the invention is the provision of such a vehicle which, when coupled in a train of vehicles, positively and accurately follows the lead vehicle around corners.

An important aspect of the invention is the manner in which the articulated vehicles, each comprising a front unit and a rear unit, are intercoupled. The intercoupling is such that the rear unit of the lead vehicle is aligned positively with the front unit of the next trailing vehicle, thereby to provide in effect a bogie including the two rear wheels of the lead unit and the two front wheels of the trailing unit. For purposes of this explanation and the appended claims, "bogie" refers to a support arrangement having a plurality of wheels and which acts independently, whether such arrangement is a two-wheel unit or a four-wheel unit comprised of pairs of wheels from two adjacent vehicles. With such an intercoupling arrangement, the articulated vehicles in a train positively follow around corners along a desired course, thus satisfying an important object of the invention.

FIGURE 1 is a perspective illustration depicting the manner in which a vehicle train composed of vehicles constructed in accordance with the inventive principles rounds a corner;

FIGURE 2 is a plan view, with the upper body portions removed, of a single articulated modular vehicle constructed in accordance with the invention.

FIGURE 1 depicts a plurality of vehicles 20, 21, 22, and 23 constructed and intercoupled in accordance with the inventive principles to provide a vehicle train. The head end or lead vehicle 20 comprises a front unit 24 and a rear unit 25, with the designations "front" and "rear" referencing the unit components of the vehicle with respect to the normal direction of travel. A pair of front wheels 26 and 27 support front unit 24 as illustrated, and a pair of rear wheels 28 and 30 support rear unit 25. A cab 31 is affixed to front unit 24 of vehicle 20.

The illustration of FIGURE 1 indicates that rear unit 34 of the second vehicle 21 is positioned at an angle with respect to front unit 33 of the same vehicle, as the vehicle train moves around an obstacle or rounds a corner at an intersection. The third vehicle 22 in the train comprises a front unit 35 and a rear unit 36. As this vehicle rounds the corner, it is noted that there is an angular displacement or relationship between front unit 35 and rear unit 36. In accordance with an important aspect of the inventive teaching, rear unit 34 of vehicle 21 is intercoupled with front unit 35 of vehicle 22 so that these two units cooperate to form a bogie or an independent supporting unit. For the present purposes, it is sufficient to emphasize that the articulation or angular movement of the various vehicles of the train is effected between the individual units of each vehicle, such as units 33 and 34 of vehicle 21, as the train rounds the corner, but the intercoupling between vehicles is such as to cause the front unit of each vehicle to follow in line with the trailing unit of the preceding vehicle, thereby affording a bogie-type component. Such operation affords positive control and excellent following characteristics of each vehicle in the train as direction changes are effected from the lead vehicle.

In FIGURE 1, a container 37 is also illustrated, and this container is receivable within the well of the rear unit 36 of vehicle 22 in an obvious manner. Container 37 can be of the well-known Conex type and it is noted that the construction of the invention permits a Conex-type load to be carried with a relatively low center of gravity of the overall vehicle, rather than requiring mounting of the Conex container entirely above the uppermost portion of the vehicle tires.

In FIGURE 2, the lead vehicle 20 is illustrated, with the cab and structural plate components removed, to illustrate the articulation of the vehicle and the mounting of major components thereon. In the front portion, a conventional internal-combustion engine 40 is positioned, and a pair of variable displacement pumps 41 and 42 are affixed thereto so that operation of the motor 40 is effective to displace the actuator units within the pumps 41 and 42. Each of pumps 41 and 42 includes a projecting stem or control element, referenced by numerals 43 and 44 respectively. An oil reservoir 45 (FIGURE 2) is provided to supply oil, the operating fluid of the illustrated embodiment, over lines 46 and 47 to pumps 41 and 42, respectively. From pump 41 another oil line 48 provides intercoupling with a bank of control valves 50, and another line 51 intercouples pump 42 with other control valves in the same bank.

A pair of beam members 52 and 53 are provided as indicated, each extending from a point adjacent a front wheel in front unit 24 in the form of a V and joined at the apex of the V by a coupling unit 54, thereby forming in effect a single extension member which is pivotally coupled by a pin 55 to a main beam 56 in rear unit 25 of vehicle 20. Beam 56 is pivoted about a vertical pin 57, with the rear portion of beam 56 extending downwardly (not visible in FIGURE 2) and received in an arcuate channel member 58 for guiding this portion of the main beam as it is pivoted around shaft 57. The respective ends of channel 58 are affixed to a pair of support beams 60 and 61 joined together in a V-shaped support unit with the apex thereof adjacent shaft 57 and the extremities of the V-unit supporting the motor-and-rear-wheels assemblies.

A plurality of cantilever beams or supports 62–65 extend outwardly from a location just to the rear of shaft 57, to afford support for container or load deposited within the well of rear unit 25. A pair of fuel tanks 66 and 67 are indicated at the rear of unit 25 over the axle, and another cantilever support beam 68 extends from the axle area rearwardly to a location adjacent the rear extremity of unit 25.

Rear tire 28 is broken away, indicating generally the manner in which one of the hydrostatic drive motors 70 is supported adjacent the extremity of the axle to drive the wheel. Responsive to receipt of fluid transmitted from front unit 24 through one of lines 71 to hydrostatic motor 70, angular rotation of rear wheel 28 is effected.

A first cylinder assembly 72 and a second cylinder assembly 73 are utilized to provide the articulation or relative angular displacement between front unit 24 and rear unit 25 of the vehicle 20. Cylinder 72 includes a barrel portion 74 and a cylinder rod 75 with one end of rod 75 affixed by a pivotal coupling unit 76 to a side of beam 52 as indicated. Likewise, the end of barrel 74 remote from the cylinder rod is pivotally coupled by a unit 77 to one side of main beam 56 in rear unit 25. Cylinder assembly 72 is a double-acting unit, and a pair of fluid lines 78 and 80 affords ingress and egress of the oil to either side of the cylinder head. Likewise cylinder assembly 73 is also a double-acting unit, with one end of barrel 82 pivotally coupled by assembly 84 to one side of beam 61, and an end portion of cylinder rod 83 pivotally coupled by an assembly 85 to one side of main beam 56 in the rear unit of vehicle 20.

The two cylinder assemblies 72 and 73 are connected to be regulated by a single control, but physically their actions are opposite. That is, if a "turn right" signal is being executed by the mechanism of vehicle 20, the oil flow into and out of cylinder assembly 72 is such as to cause cylinder rod 75 to become extended or moved outwardly with respect to barrel 74, causing a clockwise movement of the V-shaped extension member including beams 52 and 53 with respect to main beam 56 in rear unit 25. At the same time, in the other cylinder assembly 73 cylinder rod 83 is moving inwardly within barrel 82, simultaneously effecting a clockwise angular displacement of beam 56 about an axis coincident with the center of shaft 57. Accordingly the net effect of the two separate rotational movements is cumulative, providing for a substantial effective angular displacement between front unit 24 and rear unit 25.

While only a particular embodiment of the invention has been described and illustrated, it is apparent that modifications and alterations may be made therein. It is therefore the intention in the appended claims to cover all such modifications and alterations as may fall within the true spirit and scope of the invention.

What is claimed is:

1. For use in a mobile vehicle having a front unit and a rear unit, each having wheels fixed in the longitudinal direction, articulation means comprising:
   means on one of said units providing a reference pivot axis;
   a reference member, having a first portion journaled about said reference pivot axis to afford movement of said reference member about said axis, and a second portion defining a secondary pivot axis;
   a first actuating means, coupled to said reference member, for effecting angular displacement thereof about said reference pivot axis;
   means for intercoupling the other said units to said one unit about said secondray pivot axis to afford pivotal movement between the front and rear units;
   a second actuating means, coupled between said reference member and said other unit, to afford relative angular displacement about said secondary pivot axis;
   and means for concomitantly operating said first and second actuating means, thereby to provide movement of said reference member with respect to said one unit in a given angular direction and simultaneous, movement of said reference member with respect to the other of said units in a direction opposite to said given angular direction, to provide a cumulative articulated movement of the front and rear units of said vehicle.

2. In a motor vehicle having a front unit with a rigid extension member affixed thereto and a rear unit including means defining a fixed pivot axis thereon, said front and rear units having wheels fixed in the longitudinal direction, articulation means comprising:
   a reference member having a first part journaled about said fixed pivot axis on said rear unit and having a second part defining a movable pivot axis;
   means for intercoupling the rigid extension member of said front unit with said reference member about said movable pivot axis to afford pivotal movement between said reference member and the rigid extension member of the front unit;
   a first cylinder assembly coupled to said reference member for effecting displacement thereof about said fixed pivot axis;
   a second cylinder assembly, coupled between said reference member and said rigid extension member of the first unit, for effecting relative displacement therebetween;
   and means for effecting simultaneous operation of said first and second cylinder assemblies, to effect opposite angular movement of said units with respect to said reference member to provide articulation of said vehicle about said fixed and movable pivot axes.

3. In a modular vehicle including a front unit with a pair of support members joined together to effectively provide a single rigid coupling member, and a rear unit including a track portion, said front and rear units having wheels fixed in the longitudinal direction, articulation means for said vehicle comprising:
   first pivot means disposed on said rear unit and defining a first pivot axis;
   a main beam, having an intermediate portion journaled about said first pivot means for rotation thereabout, a first end portion defining a second pivot axis, and a second end portion for movement in said track portion as said main beam is rotated about said first pivot axis;
   means for coupling the rigid member of said front unit to said main beam for rotation about said second pivot axis, thereby to afford articulation of said front unit with respect to said rear unit about said second pivot axis;
   a first double-acting cylinder assembly, having a first end portion coupled to said main beam and a second end portion coupled to one of the support members in said front unit, for effecting articulated movement about said second pivot axis;
   a second double-acting cylinder assembly, coupled between a reference point on said rear unit and said main beam, for effecting angular displacement of said main beam about said first pivot axis and thus affording a cumulative articulated movement of said rear unit with respect to said front unit;
   and means for effecting simultaneous operation of said first and second cylinder assemblies to afford opposite angular articulation of said front and rear units with respect to said main beam.

References Cited by the Examiner
UNITED STATES PATENTS
2,930,631   3/1960   Voorhees _____ 180—79.2

BENJAMIN HERSH, *Primary Examiner.*

J. H. BRANNEN, *Assistant Examiner.*